G. A. FOX.
APPARATUS FOR MAKING AND DRESSING PAPER DOLLS.
APPLICATION FILED FEB. 19, 1915.
1,176,672.
Patented Mar. 21, 1916.
5 SHEETS—SHEET 2.
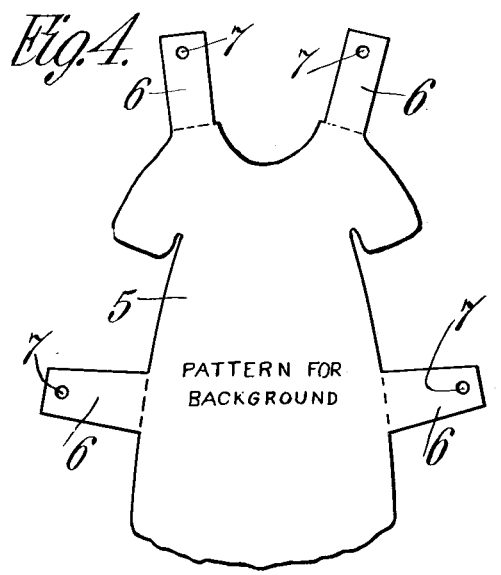
Fig. 4.
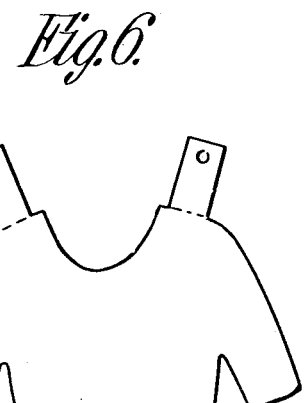
Fig. 6.
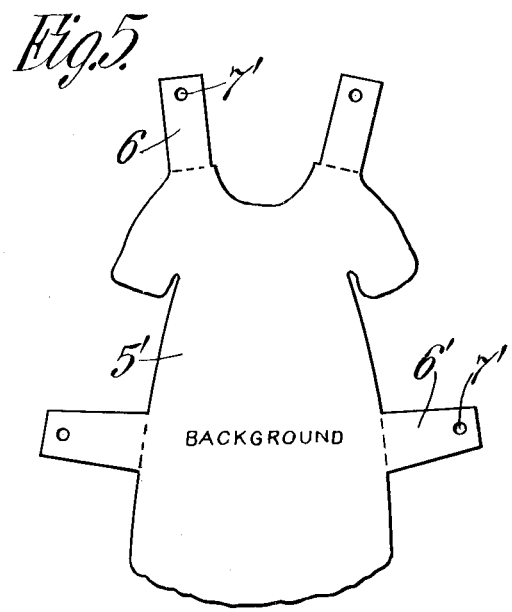
Fig. 5.
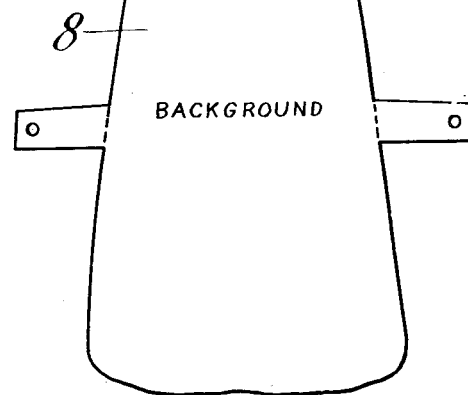
WITNESSES:
H. E. Hartwell
Edith M. Potter
INVENTOR.
George A. Fox.
BY Chapin & Co.
ATTORNEY.

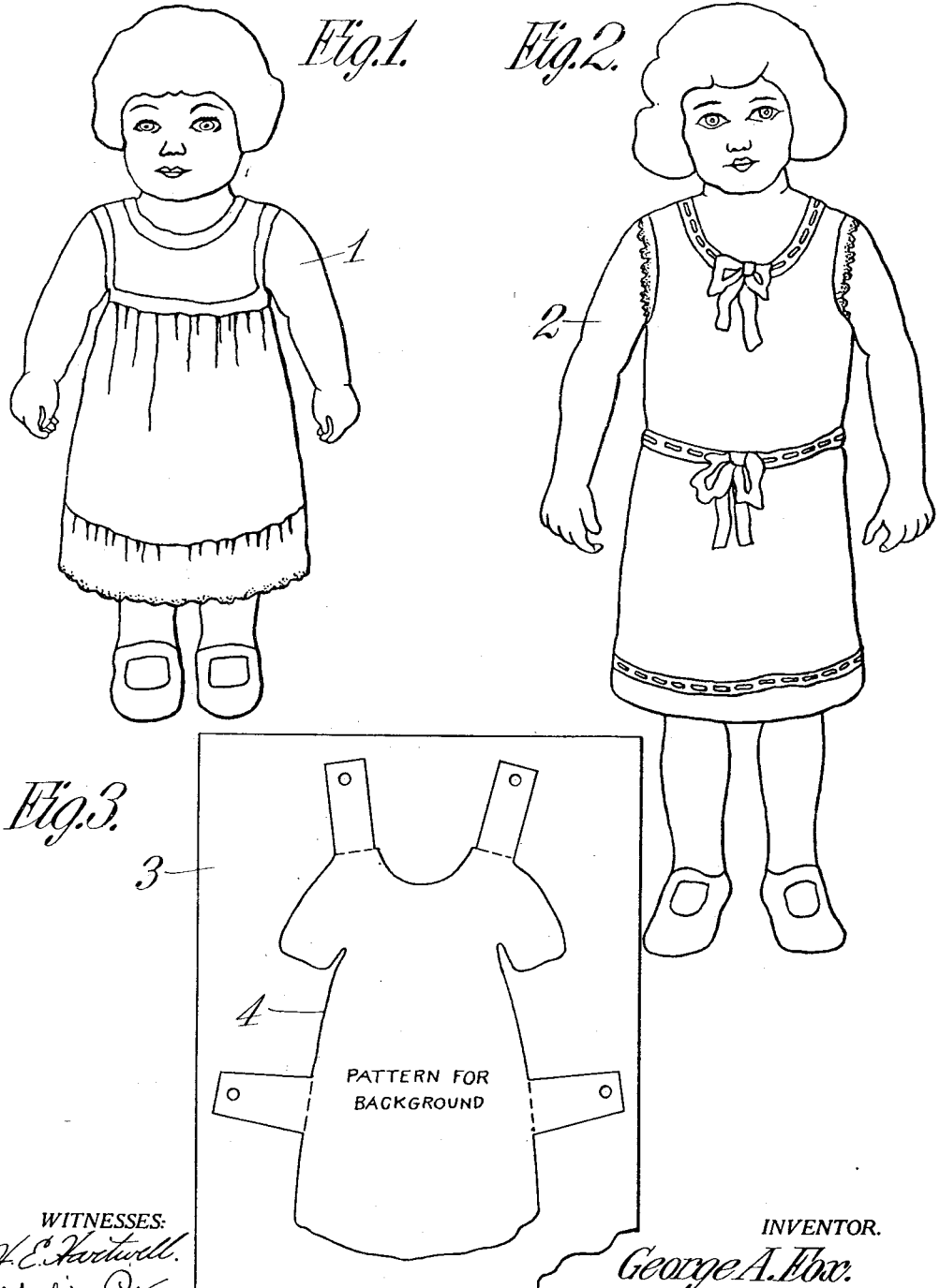

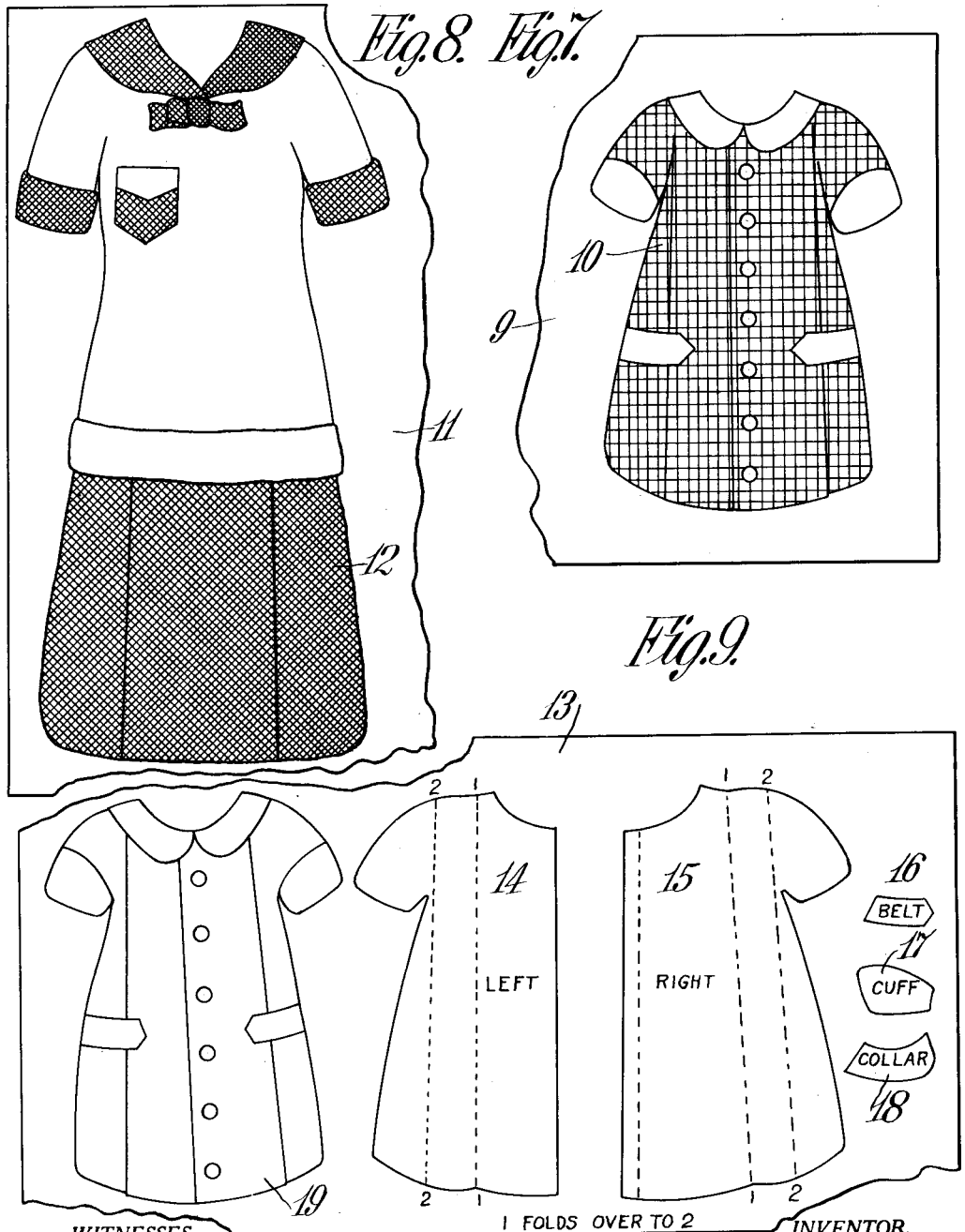

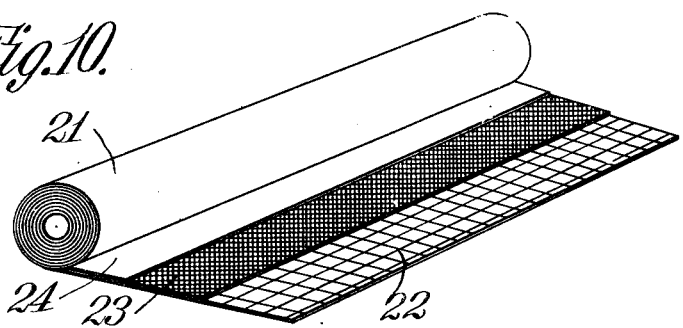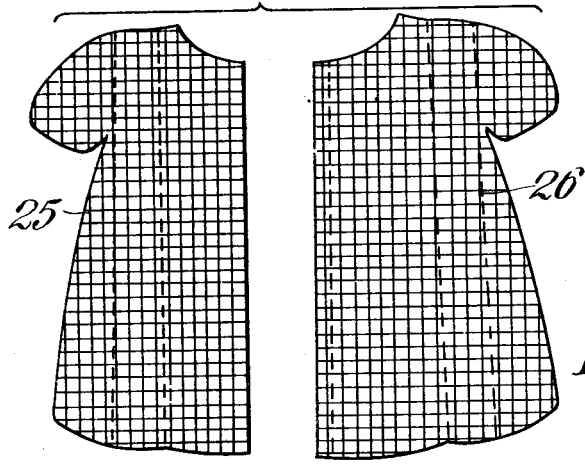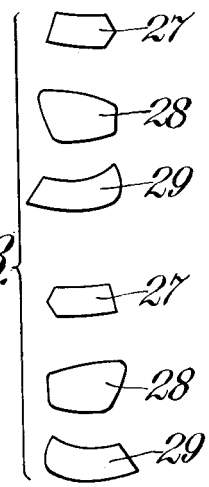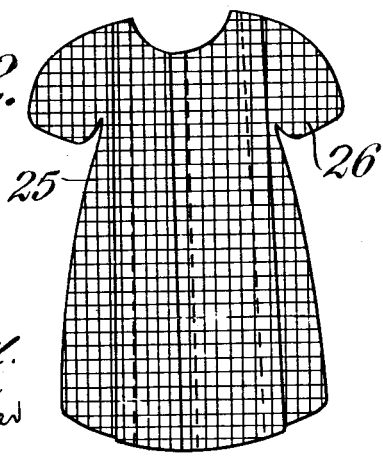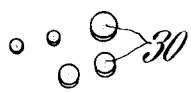

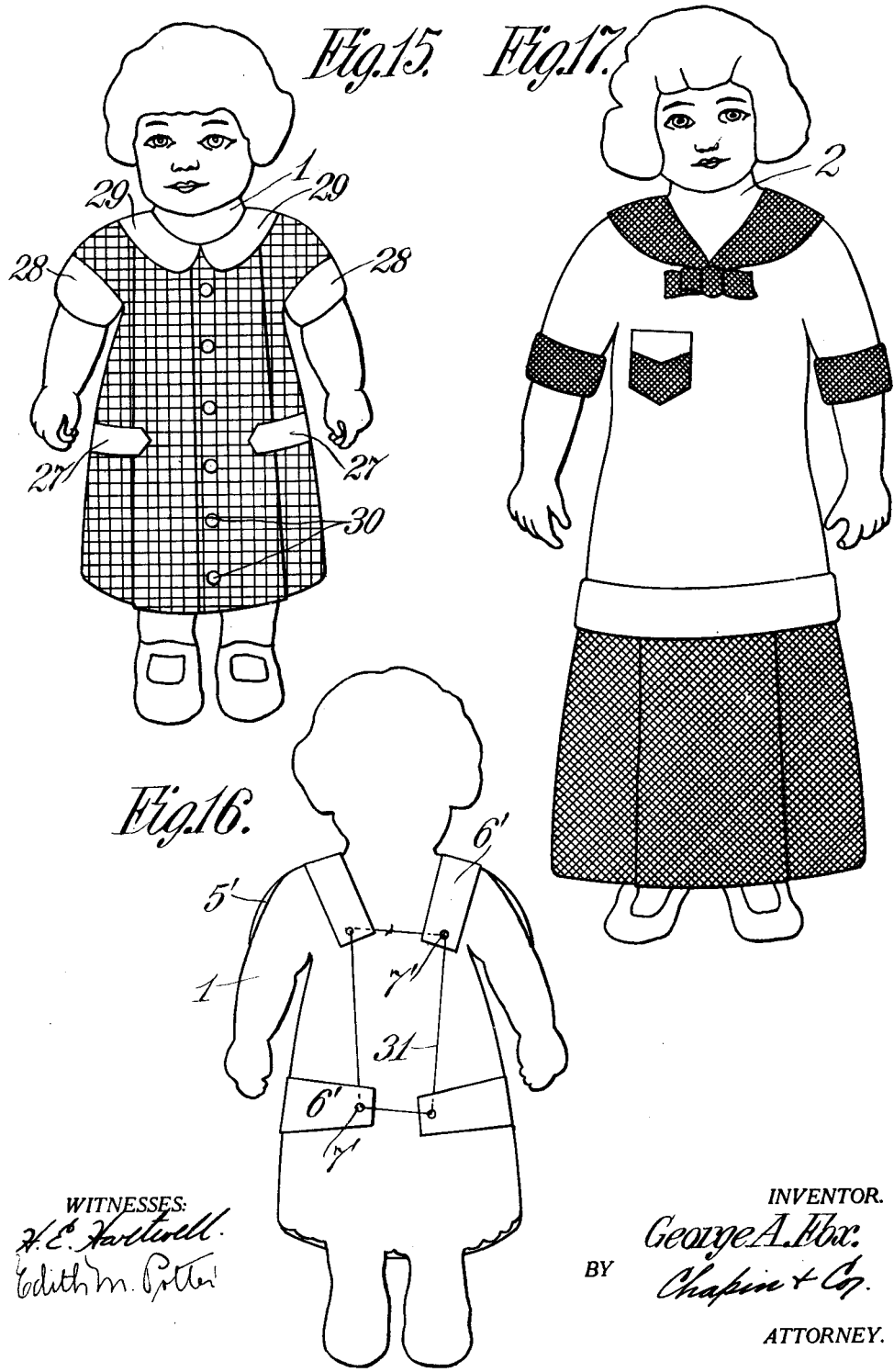

UNITED STATES PATENT OFFICE.

GEORGE A. FOX, OF SPRINGFIELD, MASSACHUSETTS, ASSIGNOR TO MILTON BRADLEY COMPANY, OF SPRINGFIELD, MASSACHUSETTS, A CORPORATION OF MASSACHUSETTS.

APPARATUS FOR MAKING AND DRESSING PAPER DOLLS.

1,176,672. Specification of Letters Patent. Patented Mar. 21, 1916.

Application filed February 19, 1915. Serial No. 9,426.

*To all whom it may concern:*

Be it known that I, GEORGE A. Fox, a citizen of the United States of America, residing in the city of Springfield, county of Hampden, and State of Massachusetts, have invented certain new and useful Improvements in Apparatus for Making and Dressing Paper Dolls, of which the following is a specification.

This invention relates to apparatus for making and dressing paper dolls, and is especially constructed, designed and arranged to furnish a pleasing and instructive pastime for children.

An object of the invention is to provide apparatus for making and dressing paper dolls, which will require a child using the apparatus to simulate the dressmaking art as practised by its elders.

Another object is to provide paper doll apparatus, which is adapted not only to provide a pleasing pastime, but to furnish an educational apparatus for children, and aid in the cultivation of taste and discrimination in the selection of material, color schemes and styles.

My apparatus in its preferred form comprises for its foundation a set of paper doll forms of various sizes, paper fashion plates showing a variety of the present day styles, paper dress patterns, paper dress goods and paper buttons. The fashion plates are distinctively printed in colors to show not only the style of the dress but various color schemes. The dress patterns are also reproductions of modern cloth patterns and are arranged to allow the child to exercise the fundamental principles of dressmaking, such as cutting, plaiting and trimming. The dress goods themselves comprise rolls of paper distinctively colored and printed to imitate different kinds of cloth. This apparatus permits the child to select, the style of dress desired from the fashion plates, a dress pattern corresponding to the style and the desired dress goods. The child, in making her dress takes the same preliminary steps and may exercise extensively the same discrimination in the selection of style, material and color scheme as does her mother. The dress formed by the child necessarily varies from the actual dress made by her mother since the dress is to be attached to a paper doll. As the latter is flat, some different means of attaching the dress to the doll must be provided and pasting of the dress directly to the doll might be used. This method would obviously, spoil the doll itself for future dressing and in time would exhaust the supply of dolls furnished in the set. Therefore, I provide with my apparatus various patterns corresponding to the different sizes of dolls and styles of dress, by means of which a suitable foundation or background may be cut from ordinary wrapping paper. The dress is pasted directly to this foundation and means are provided on the latter, whereby it may be removably secured to the doll. Thus with proper use the apparatus is inexhaustible, with the exception of the paper dress goods which can most easily be renewed.

In the accompanying drawings, wherein I show for the purposes of illustration a preferred embodiment of my invention: Figures 1 and 2 show two of the doll forms cut out of cardboard furnished with my apparatus; Fig. 3 shows a card printed with a pattern for a background for the doll shown in Fig. 1; Fig. 4 shows this pattern cut out; Fig. 5 shows a background cut from suitable material by means of the pattern shown in Fig. 4; Fig. 6 represents a background for the doll shown in Fig. 2 formed in a similar manner, from another background pattern (not shown); Fig. 7 represents a portion of one of the fashion plates furnished in my apparatus and shows a style of dress suitable for the doll shown in Fig. 1; Fig. 8 represents another style plate showing a style of dress suitable for the doll shown in Fig. 2; Fig. 9 represents a card with a dress pattern printed thereon, which is suitable for the dress in the fashion plate shown in Fig. 7; Fig. 10 is a perspective view of a roll of assorted "dress goods" from which the dress is to be made; Fig. 11 is a view of a dress cut from the goods shown in Fig. 10, by means of the pattern shown in Fig. 9; Fig. 12 is a view showing the dress of Fig. 11 folded, and assembled ready to be fastened to the background shown in Fig. 5; Fig. 13 is a view showing various trimmings for the dress of Fig. 12 which have been cut from the dress goods by means of the pattern shown in Fig. 9; Fig. 14 represents a variety of "buttons" comprising circular pieces of cardboard for use in trimming the dresses; Fig. 15 is a front view of the doll shown in Fig. 1 dressed with the dress shown in Fig. 12; Fig. 16 is a rear view of Fig. 15, showing the means by which the dress and background are attached to the doll; Fig. 17 is a front view of the doll shown in Fig. 2, dressed in a similar manner.

Referring to the drawings in detail: Figs. 1 and 2 show two dolls 1 and 2, which form a part of my apparatus. Each of these dolls are accurately cut from cardboard and are printed and colored to represent facial features, hair, underclothing and footwear. A number of these dolls are actually furnished with the apparatus, but two only have been shown for the purposes of illustration.

Fig. 3 shows one of a number of patterns forming a part of the apparatus. Each comprises a suitable card 3 with an outline 4 printed thereon, which is to be cut out to form a pattern 5 as shown in Fig. 4. This pattern 5 is used to form a background or foundation to which a dress, formed by means to be described, is to be secured. Formed on the pattern are tabs 6 in which holes 7 are formed. This pattern 5, after having been once cut from the card 3, is preserved as a part of the apparatus and is not used as a part of the dress. It forms a pattern, which may be used over and over again, wherefrom a suitable background 5' may be cut. This background may be formed from common brown wrapping paper or other desired material and has ears 6' with holes 7' corresponding to the pattern. Fig. 6 shows a background 8, formed in a similar manner from another pattern not shown, which is suitable for the doll shown in Fig. 2.

Referring to Figs. 7 and 8: 9 and 11 represent portions of cards which have printed thereon a variety of styles of dresses. These cards are printed and lithographed and portray in a distinctive manner a large variety of the present day styles of dresses. Selections from these cards or "fashion plates" 9 and 11, are shown at 10 and 12 and the styles 10 and 12 are selected as suitable for the dolls 1 and 2 respectively. Each of the styles shown on these fashion plates 10 and 12 are marked with a number (not shown) by means of which the child may identify a dress pattern to correspond therewith. One of these dress patterns corresponding to the style shown at 10 is shown in Fig. 9. The press patterns are printed on cards such as are shown at 13. The card 13 has at its left-hand end a printed outline 19 of the dress as it should appear when completed. At the other end it bears patterns for the various parts of the dress and directions for folding the same. Thus, in Figs. 9, 14 and 15 are patterns for the right and left hand portions of the dress, and 16, 17 and 18 are patterns for the belt, cuff, and collar respectively. The patterns 14 and 15 have printed thereon dotted lines, which are numbered, and directions there below as to the folding of the dress upon these lines, all as clearly shown in the drawings. The outline 19 serves simply as a guide to aid the child in assembling the various parts of the dress in proper form. The cards 13 constitute a permanent part of the apparatus and the patterns thereon are arranged to be traced on tissue paper. The dress goods are cut from this tissue pattern and the card 13 is preserved as a master pattern.

As a part of the apparatus, rolls of paper, printed and colored to simulate dress goods, are supplied. One of these rolls is shown at 21, in Fig. 10, which has several sheets of paper shown at 22, 23, and 24. The complete set comprises a number of these rolls of assorted papers from which a wide range in the selection of material is permitted. The "dress goods" material 22 is suitable for the body of the dress shown in Fig. 7 and the material 24 is suitable for the cuffs, belt and collar of this dress.

Fig. 11 shows the two portions 25 and 26 of a dress cut from a pattern which was formed from the master patterns 14 and 15. Fig. 12 shows these two portions folded in accordance with the directions on the card 13 and assembled ready to be secured to the background 5', Fig. 5. 27, 28 and 29 represent belts, cuffs, and collars cut from the material 24, from a pattern which was traced from the master patterns 16, 17, and 18 shown in Fig. 9. Fig. 14 shows buttons 30 of various sizes which comprise circular bits of cardboard. These buttons 30 may be used as they are, or they may be covered with colored paper to match the dress.

In order to illustrate the use of this apparatus, the steps necessary in forming a dress for the doll 1 will be described.

From the various background patterns in the apparatus, one, such as the card 3, is selected, which fits the doll 1. This card 3 is then cut around the outline 4 to form a pattern 5 for making backgrounds. With this pattern, a brown paper reproduction thereof is formed, which constitutes a background or foundation. It is next necessary to decide on the style of dress desired and from the numerous fashion plates, such as 9 and 11, a suitable style 10 is selected. The dress pattern, shown on the card 13, which corresponds with the style 10, is easily selected by means of suitable identification numbers on each of the cards 9 and 13. Having determined the style and pattern for the dress, the material therefor remains to be obtained. From the many rolls 21 of "dress goods" in the apparatus suitable material is selected, for example the goods 22 for the body of the dress, and the goods 24 for the trimmings. If desired, the child may exercise its individual taste and select other color schemes not shown on the style plate 9. The various patterns on the card 13 are then traced off on tissue paper and the latter are used as patterns from which to cut the dress goods. Thus, the card 13 may be preserved as a master pattern. After the various portions of the dress have been cut out, the body portions 25 and 26 are folded to bring the two dotted lines (numbered 1 and 2 on the card) into coincidence, which gives a plaited appearance to the dress. The right hand portion 26 is then carefully pasted on the background 5' and the portion 25 is thereafter laid on and secured to the background so that the right hand edge thereof coincides with the dotted line adjacent the left hand edge of the portion 26. The belt 27, cuffs 28, and collar 29 are next pasted on the dress using the diagram 19 as a guide. Lastly buttons 30, of the desired size, are selected and pasted on the dress as called for by the diagram 19. The dress is now completed and assembled on the background 5'. It is thereafter applied to the doll 1 by folding the tabs 6 on the background 5' over the back of the doll as shown in Fig. 16. These tabs 6 are then laced together by a thread 31 which is passed through all of the holes 7 and tied as shown. The doll 2 may be dressed in a similar manner to appear as shown in Fig. 17. Furthermore, various other dresses of different styles and color schemes may be applied to these dolls from this apparatus. Due to the wide variety of styles, patterns and dress goods in the apparatus a wide range of selection is permitted in which the child may exercise its individual talent.

Thus the apparatus, aside from providing a pleasing amusement for the child, has an important educational feature since it cultivates taste, judgment and discrimination in the selection of materials. It supplies instruction in the elementary operations of dressmaking such as cutting, plaiting, fitting and trimming. The apparatus designed for miniature dressmaking is characterized in that with the exception of the dress goods supplied, it is not used up in dressing the dolls. It provides the dolls, and tangible, visible instruction apparatus to guide the child through the various steps, whereby the dolls may be dressed.

The apparatus has been described in its various parts. In its commercial form all the parts are assembled into a suitably labeled box and then serves as a most instructive and unique paper doll making outfit.

It is to be understood that various modifications may be made in the form of apparatus specifically described without departing from the scope of my invention which is defined in the appended claims.

What I claim is:

1. A paper doll outfit, comprising, a suitably printed cardboard doll form, a suitably printed style card showing the doll form dressed in various styles and combinations of dress goods, a master pattern card showing the outline suitable for a complete paper doll dress to fit the doll form, a master pattern card showing the outline of the parts and manner of assembling to form a complete paper doll dress, and sheets of suitably printed paper simulating various cloth patterns, all designed and arranged so that a child has visible and tangible instruction apparatus whereby said doll form may be dressed in various styles and colors without using up the apparatus other than the sheets of paper.

2. A paper doll outfit, comprising, suitably printed cardboard doll forms, suitably printed style cards showing dresses for the doll of various styles and combinations of dress goods, master pattern cards showing the outlines suitable for complete paper doll dresses to fit the doll forms, other master pattern cards showing outlines of the parts and manner of assembling to form complete paper doll dresses, and sheets of suitably printed paper simulating various cloth patterns, all designed and arranged so that a child has visible and tangible instruction apparatus whereby said doll forms may be dressed in various styles and colors without using up the apparatus other than the sheets of paper.

3. A paper doll outfit, comprising, a number of suitably printed cardboard doll forms, a number of suitably printed style cards showing dresses for each of the doll forms in various styles and combinations of dress goods, a number of master pattern cards showing outlines suitable for complete paper doll dresses to fit each of the doll forms, a number of master pattern cards showing the outline of parts and manner of assembling to form complete paper doll dresses for each of the styles portrayed in said style cards, and sheets of suitably printed paper simulating various cloth patterns, all designed and arranged so that a child has visible and tangible instruction apparatus, whereby said doll forms may be dressed in various styles and colors without using up the apparatus other than the sheets of paper.

GEORGE A. FOX.

Witnesses:
Wm. H. Chapin,
H. E. Hartwell.